3,694,310
FUEL CELL ORGANIC FIBER MATRIX

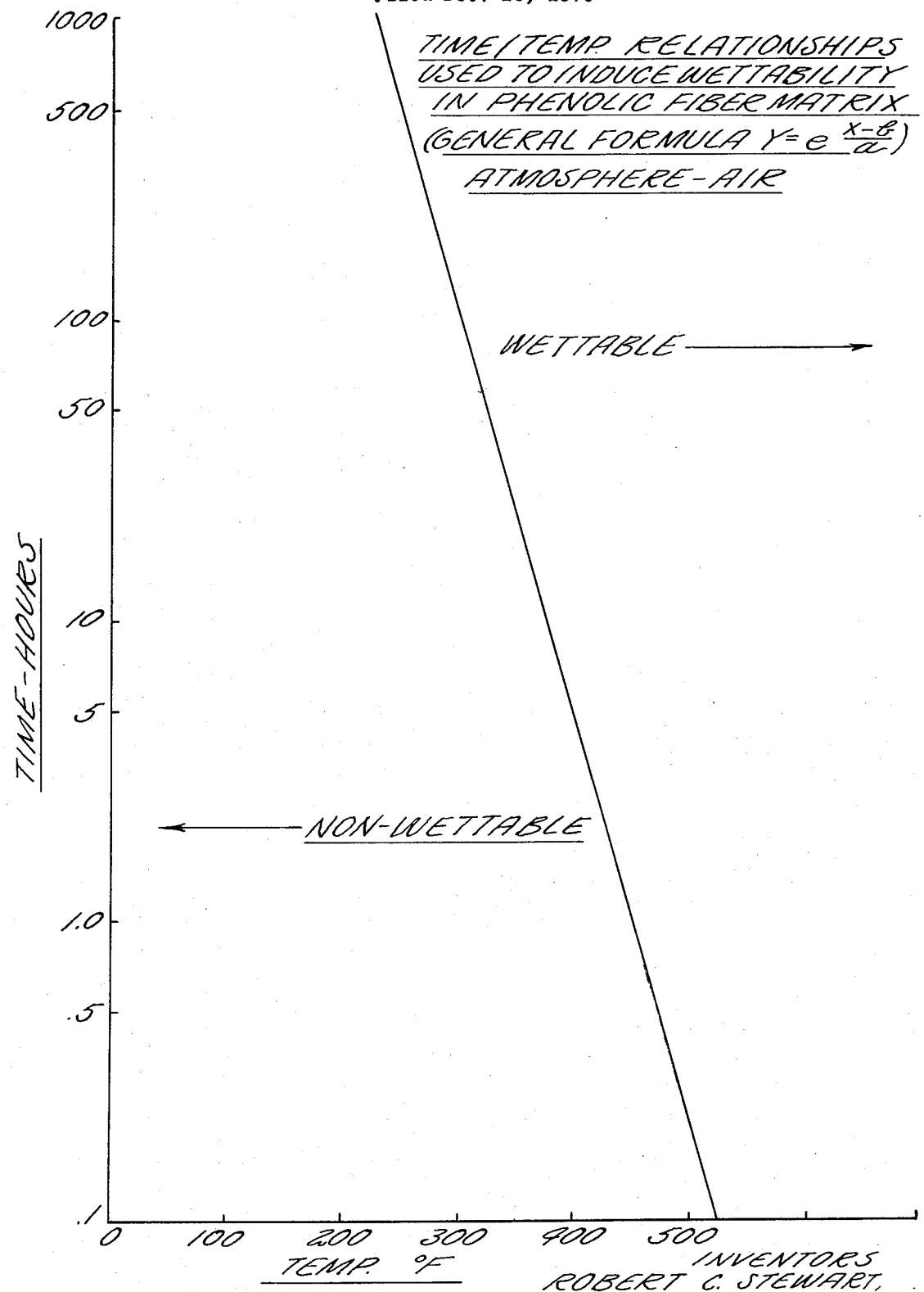

Roger C. Emanuelson, Glastonbury, Robert C. Stewart, West Suffield, and Raymond W. Vine, Tolland, Conn., assignors to United Aircraft Corporation, East Hartford, Conn.
Filed Dec. 16, 1970, Ser. No. 98,791
Int. Cl. D21h 3/50; H01m 3/00
U.S. Cl. 162—157 R      6 Claims

ABSTRACT OF THE DISCLOSURE

A wettable organic fiber matrix is provided by coating phenolic resin fibers with a phenolic beater addition resin forming the matrix, curing the beater addition resin, and making the matrix wettable by heating the matrix in air or in a partially inert atmosphere.

BACKGROUND OF THE INVENTION

Field of the invention.—This invention relates to an organic fiber matrix and particularly to a wettable phenolic resin coated phenolic fiber matrix having particular utility in fuel cell applications.

Description of the prior art.—Phenolic resin fiber mats exhibit superior resistance to corrosion in acids such as phosphoric and sulphuric and are, therefore, desirable for use as electrolyte retention matrices. However, the phenolic resin mats are not adequately wettable and, therefore, will not absorb liquid. Even when they are filled with liquid under vacuum, there is no liquid flow in the mat from one area to another. When the mats are utilized as electrolyte matrices in fuel cells, areas of differing electrolyte volume develop, leading to a lowering of performance by the fuel cell. This occurs because the optimum catalyst-gas-electrolyte interface to maximize performance is not achieved throughout the fuel cell.

SUMMARY OF THE INVENTION

The object of the present invention is to produce an increased strength, extremely uniform, thin, wettable matrix of phenolic resin fibers having the required pore size.

In accordance with the present invention the above and other objects and advantages are achieved by coating phenolic resin fibers with a phenolic beater addition resin before forming the matrix, curing the beater addition resin after the matrix has been formed, and making the matrix wettable by heating it in an oven in either air or a partially inert atmosphere at a temperature of about 500° F. to about 250° F. for a period of from about 10 minutes to about 500 hours, depending on the temperature to which the matrix is heated. We have found that this time-temperature relationship may be expressed mathematically by the general formula:

(1) $$\frac{e^{\frac{x-b}{a}}}{y} = K$$

where $x$ = the treatment temperature (° F.);
$y$ = the time (hr.);
$a$ = a constant;
$b$ = a constant; and
$K$ = a constant The value of the constants $a$ and $b$ appear to depend somewhat on the conditions in the particular oven being utilized during the heating process, such as, for example, air circulation in the oven and dew point. We have found that the following expression quite accurately predicts the wettability of a phenolic resin coated phenolic fiber matrix made according to our invention:

(2) $$\frac{e^{\frac{x-446.7}{-31.2}}}{y} \leq 1.5$$

Preferably a matrix will be made wettable if $x$ (temperature) and $y$ (time) are selected such that the expression $$\frac{e^{\frac{x-446.7}{-31.2}}}{y}$$

is less than or substantially equal to one. Due to the differing conditions within various ovens, some tolerance must be allowed in the determination of the constants $a$ and $b$ used in the above expression. Also, in differing ovens, a wettable matrix may be produced if temperature ($x$) and time ($y$) are selected such that the expression $$\frac{e^{\frac{x-446.7}{-31.2}}}{y}$$

is equal to up to about 1.5. However, it will be understood by those skilled in the art that in order to be assured of obtaining a wettable matrix by our process, the temperature and time are critical and must be selected so that the point determined by their values falls on or to its right of the curve shown in the figure. That is, in effect, saying that the expression $$\frac{e^{\frac{x-446.7}{-31.2}}}{y}$$

is substantially equal to, or less than, one. Substantially equally to one may be taken to include up to about one and one-half, depending on the oven used. A tolerance of about ten percent should also be allowed for the values of $a$ and $b$, as will be understood by those skilled in the art.

The foregoing and other objects, features and advantages of the present invention will become more apparent in light of the following detailed description of a preferred embodiment thereof, as illustrated in the accompanying drawing.

BRIEF DESCRIPTION OF THE DRAWING

The sole figure is a graphical illustration of the time-temperature relationship of the process of making the phenolic resin coated phenolic fiber matrix wettable.

DESCRIPTION OF THE PREFERRED EMBODIMENT

One technique, for example, which we have found highly satisfactory to produce the improved matrix involves dispersing loose phenolic resin fibers (such as Kynol fiber, manufactured by the Carborundum Co.) with phenolic beater addition resin (such as type V 1129, manufactured by the Bendix Corp.) in the proportions of about 70 to 90 percent by weight fiber and 10 to 30 percent by weight of the beater addition resin in water which may be distilled. The beater addition resin is soluble in the water as long as alkaline conditions prevail. To coat the suspended phenolic fibers with resin, the pH of the mix is reduced to a pH of about 4.5 by adding an acidifying agent such as acetic and/or phosphoric acid. Upon addition of the acidifying agent to the fiber-resin suspension the resin precipitates out of solution and forms a colloidal emulsion. As additional acidic precipitant is added, the emulsion "breaks" at a pH of about 4.5 and the resin is absorbed on to the fiber surfaces in the form of minute droplets of microscopic size. These droplets coalesce and form a film which partially coats each fiber. When water is removed in a standard paper making technique or by a conventional filtration method, the resin surfaces are brought close together and the fibers bond to each other, thus forming the desired fiber matrix. The mat may then be air dried to evaporate the water. The mat is then heated to a temperature of about 290–310° F. for up to 30 minutes to cure the phenolic beater addition resin coating on the fiber. Curing of the resin results in a chemical bonding of the fibers producing a uniform, strong matrix with an average pore size of about 5 microns; an uncoated fiber matrix, by comparison, has an extremely weak structure with a nonuniform and relatively large pore size range. It has been found advantageous to place the matrix on a nickel screen when the matrix is cured in air. The matrix can also be cured by suspending it in a nitrogen (or other inert gas) atmosphere and curing according to the time and temperature given above.

To make the matrix produced according to the above process wettable, it is heated in an oven in air, with the time and temperature being selected such that the expression $$\frac{e^{\frac{x-446.7}{-31.2}}}{y}$$

is less than or substantially equal to about one to 1.5, where $x$ is the temperature (° F.) and $y$ is the time (hr.). We have found that the upper limit for temperature is about 500° F. Above that temperature the phenolic fiber ignites. Therefore, if it were desired to use a higher temperature in the wettability process, an inert gas atmosphere would have to be utilized in the oven to prevent ignition. The preferred wettability process takes place at 450° F. ±5° and is accomplished in less than one hour, making it an ideal technique for the rapid production of wettable matrices for fuel cells.

There has thus been described a preferred embodiment of a wettable phenolic fiber matrix and process for the production thereof in accordance with our invention. It will be understood by those skilled in the art that various changes and omissions in the form and detail thereof may be made therein without departing from the spirit and scope of the invention.

What we claim as novel and desire to secure by Letters Patent of the United States is:

1. A method for making a wettable organic fiber matrix for electrochemical cells, comprising:
   coating phenolic resin fibers with a phenolic beater addition resin;
   forming the matrix;
   curing the beater addition resin; and
   making the matrix wettable by heating it in air or in a partially inert atmosphere according to the general formula:

$$\frac{e^{\frac{x-b}{a}}}{y} = K$$

where
   $e$ = the base of the system of natural logarithms having the approximate numerical value 2.71828;
   $x$ = the temperature (° F.) to which the matrix is heated;
   $y$ = the time (hr.) the matrix is heated;
   $a$ = a constant;
   $b$ = a constant; and
   $K$ = a constant whose value is less than or equal to 1.5 (one and five tenths).

2. A method for making a wettable organic fiber matrix as defined in claim 1, wherein the value of the constant "K" is less than or equal to one.

3. A method for making a wettable organic fiber matrix as defined in claim 1, wherein the value of the constant "a" is −31.2±3.1 (minus thirty-one and two tenths, plus or minus three and one tenth).

4. A method for making a wettable organic fiber matrix as defined in claim 1, wherein the value of the constant "b" is 446.7±44.7 (four hundred forty-six and seven tenths; plus or minus forty-four and seven tenths).

5. A method for making a wettable organic fiber matrix as defined in claim 1, wherein the value of the constant "a" is about −31.2 (minus thirty-one and two tenths);
   the value of the constant "b" is about 446.7 (four hundred forty-six and seven tenths); and
   the value of the constant "K" is equal to or less than about one.

6. A method for making a wettable organic fiber matrix as defined in claim 1, wherein $x$ is about 500° F. to about 250° F. and $y$ is about ⅙ of an hour to about 500 hours.

References Cited
UNITED STATES PATENTS

| | | | |
|---|---|---|---|
| 3,239,381 | 3/1966 | O'Connell | 136—146 |
| 3,297,638 | 1/1967 | Beaulieu | 136—146 X |
| 3,563,802 | 2/1971 | Ogden | 136—146 X |

S. LEON BASHORE, Primary Examiner

F. FREI, Assistant Examiner

U.S. Cl. X.R.

117—119.6, 119.8, 133.8 G, 140 A; 136—86 R, 146; 162—136, 165; 204—296; 264—234, 235, 345, 346